United States Patent [19]
Deylitz

[11] Patent Number: 5,807,145
[45] Date of Patent: Sep. 15, 1998

[54] BREAK-CONTACT BLOCK WITH RELATIVELY MOVABLE BRIDGE-LIKE CONTACTS

[75] Inventor: Erhard Deylitz, Berlin, Germany

[73] Assignee: Siemens Aktiengesellschaft, München, Germany

[21] Appl. No.: 693,117
[22] PCT Filed: Jan. 24, 1995
[86] PCT No.: PCT/DE95/00125
  § 371 Date: Aug. 16, 1996
  § 102(e) Date: Aug. 16, 1996
[87] PCT Pub. No.: WO95/22830
  PCT Pub. Date: Aug. 24, 1995

[30] Foreign Application Priority Data

Feb. 18, 1994 [DE] Germany ............ 44 05 900.0

[51] Int. Cl.⁶ .................................. H01R 4/48
[52] U.S. Cl. ........................... 439/819; 439/249
[58] Field of Search ................. 439/819, 249, 439/787

[56] References Cited

U.S. PATENT DOCUMENTS 4,087,668  5/1978  Nakanishi et al. .
4,230,388  10/1980 Thierry et al. ............ 439/819
4,983,132  1/1991  Weidler ................... 439/787

FOREIGN PATENT DOCUMENTS

| 0 107 611 | 5/1984 | European Pat. Off. . |
| 0 108 868 | 5/1984 | European Pat. Off. . |
| 1 092 988 | 11/1960 | Germany . |
| 1 807 296 | 12/1971 | Germany . |
| 1 665 986 | 3/1973 | Germany . |
| 2 165 940 | 7/1973 | Germany . |
| 28 51 738 | 6/1980 | Germany . |
| 51-133739 | 11/1976 | Japan . |

*Primary Examiner*—Gary F. Paumen
*Attorney, Agent, or Firm*—Kenyon & Kenyon

[57] ABSTRACT

A break-contact block includes two identical half-housings that have compartments formed by partitions to accommodate bridge-like contacts and respective springs. Two foot sections with projections in different arrangements make it possible to maintain a smaller spacing or a larger spacing depending on the relative positions of the two half-housings that are joined together. This makes it possible to manufacture break-contact blocks for thick or thin busbars using identical parts.

11 Claims, 3 Drawing Sheets

BREAK-CONTACT BLOCK WITH RELATIVELY MOVABLE BRIDGE-LIKE CONTACTS

FIELD OF THE INVENTION

This invention concerns a break-contact block for connecting and disconnecting busbars that can move relative to each other. The break-contact block comprises a housing and bridge-like contacts arranged parallel to each other in such a way that they can move relative to each other in the housing. The bridge-like contacts have contact faces at their ends for making contact with the busbars that are to be connected and they are biased against the busbars. Two contacts are arranged opposite each other to form parallel conducting paths. Such break-contact blocks are used, for example, in electric switching units arranged in a manner that allows the circuit-breakers to be withdrawn.

BACKGROUND OF THE INVENTION

A break-contact block of this type is disclosed in European patent B 107,611. The housing for this break-contact block is made of sheet metal parts that are riveted or bonded together. The spacing between the contacts is maintained by spacers with arms that reach between the contacts. Therefore, break-contact blocks with different housings are needed, depending on the thickness of the busbars to be connected. However, the contacts and spacers can be used without any changes.

OBJECTS AND SUMMARY OF THE INVENTION

The object of this invention is to reduce the variety of models required for these break-contact blocks.

According to this invention, this object is achieved by a housing comprising two half-housings having certain foot sections that are provided with passages for mounting elements that are intended for mutual contact. The half-housings are also provided with partitions to subdivide the space provided to accommodate the contacts. This subdivision of the housing of the break-contact block into half-housings makes it possible to manufacture break-contact blocks for busbars of different thicknesses by mounting the half-housings with the required distance between them. The partitions also make it possible to use a larger or smaller number of contacts or contacts with a greater or smaller thickness as needed.

Within the scope of this invention, an especially advantageous possibility of assembling the half-housings with two different fixed spacings consists of the fact that the foot sections have a base and at least one projection with a face extending outward from the base. The projections are offset with respect to each other so that when two half-housings are joined in one position, at least one projection on one foot section comes to rest with its face on the base of the opposite foot section, thereby defining a relatively small distance between the two half-housings. However, when the two half-housings are joined in a 180°-rotated position, the faces of the projections on opposing foot sections come in contact, which thus defines a relatively great distance between the two half-housings.

With a refinement of the above-mentioned design of the foot sections, it is possible to ensure that if the mounting elements are used, the two half-housings will be aligned relative to each other without any misalignment, despite the relatively small total area of the foot sections. This can be accomplished by arranging the projections and recesses in each foot section so they are symmetrical with the passage for the respective mounting device. More specifically, a design is proposed where each of the two foot sections has four projections with essentially the same total cross section that can be joined to form a closed shape to create the relatively small distance between the half-housings on the basis of their offset arrangement. This results in a stable but space-saving arrangement of the two half-housings, providing only a small distance between the two busbars that are to be connected and thus relatively short contacts.

Each half-housing of the break-contact block may have two ribbed pedestal-shaped foot sections. In this regard it is advantageous for the ribs to be designed so they form supporting faces for contact with an abutment. The significance of such a design will be discussed below.

With the prior art break-contact block described previously, the springs provided for the contacts are supported on one rib of one of the parts of which the housing for the break-contact block is made. The springs are designed as spring-loaded arms of a simple part. According to one improved embodiment of this invention, however, it has proven to be advantageous that a spring, designed as a bent wire spring whose curved leg ends are in contact with a web that is runs across the partitions on each half-housing, is provided for each contact. This has the advantage that only one spring design is needed if the break-contact blocks are to be produced with different numbers of contacts.

The above-mentioned web may have a rib that separates the ends of the legs in order to center the wire spring. This centers the springs in the compartments of the half-housings formed by the partitions, thus assuring a uniform contact force of the neighboring contacts.

To permit a certain equalization in the alignment of the busbars to be connected, it is advisable for the contacts to have a rear surface with an outward curvature for supporting them on the springs approximately in the middle.

The desired engaged length of the busbars in a break-contact block can be achieved by providing aligned recesses in the partitions of the half-housings to accommodate a spacer that has a rounded projection for coming in contact with the face of one of the busbars. The spacer keeps the contacts at a suitable distance for insertion of the busbars. The projection permits a certain pivoting of the break-contact block to compensate for errors in alignment.

As mentioned above, a preferred application for break-contact blocks of the present type would be for switchgear with relatively movable circuit-breakers. In this case, the break-contact blocks are optionally arranged on the circuit-breaker, in other words, so they are movable, or they may be stationary, i.e., mounted on the framework of the switchgear, and therefore they are always in contact with busbars on one side. The break-contact block is especially suitable for the application described here due to the above-mentioned supporting faces that are formed by the ribs of the foot sections. For this purpose, the abutments that work together with the supporting faces may be part of an insulated housing that accommodates the break-contact block. A busbar projects into the insulated housing and is mounted by means of mounting elements that seal off the housing. The break-contact block is guided when moved through the supporting faces in the insulated housing and can adjust to a difference in alignment between the busbars without any negative effects on the quality of contact achieved with the busbars.

This invention is explained in greater detail below on the basis of the embodiment illustrated in the figures.

DETAILED DESCRIPTION

Figure 1:
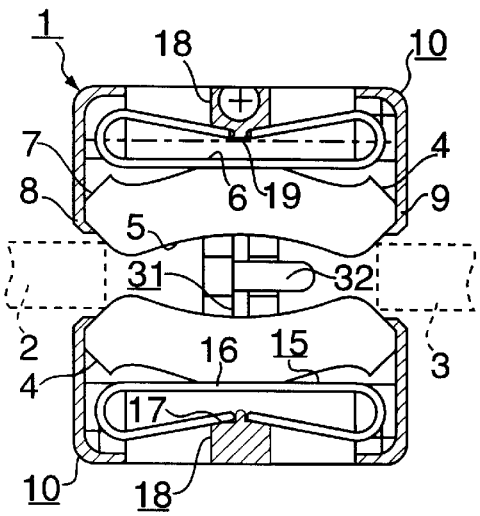
FIG. 1 is a longitudinal cross-section view of a break-contact block taken along the longitudinal direction of the busbars that are to be connected.

The break-contact block 1 according to FIGS. 1 to 5 is used to connect busbars 2 and 3 (indicated with dotted lines in FIG. 1). These busbars are in contact with but are not fully engaged with break-contact block 1. Busbars 2 and 3 are connected by means of bridge-like contacts 4 that have a convex contact area 5 at each end and a rear face 6 with an outward curvature. Contacts 4 are in contact with walls 8 and 9 of one half-housing 10 at faces 7. Two identical half-housings 10 are joined by means of foot sections 11 and 12 on the face (FIG. 2) and mounting elements 13 and 13' that pass through them. Suitable mounting elements include any type of screws, bolts and rivets.

Figure 3:
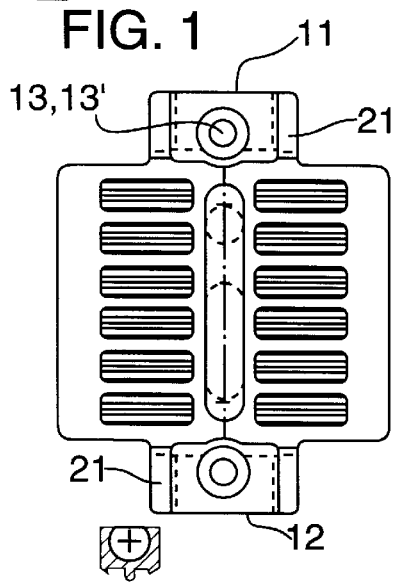
FIG. 3 is a top view of the break-contact block according to FIGS. 1 and 2.
Figure 5:
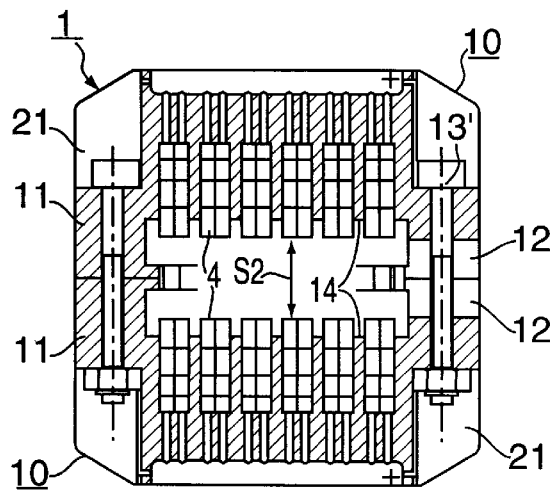

As indicated by FIGS. 3 and 5, each of the half-housings 10 is provided with partitions 14, so the half-housings are subdivided into individual compartments, each of which accommodates one contact 4. The center parts 16 of springs 15, which are in the form of bent wire springs, are in contact with the curved rear face 6 of contacts 4, and leg ends 17 are supported on a web 18 of half-housing 10 running across partitions 14. A rib 19 of the web 18 projects between the leg ends 17 and thereby centers springs 15 with respect to contacts 14. As shown in greater detail in FIGS. 3 and 5, each of the compartments of half-housings 10 contains two contacts 4 and two springs 15.

Figure 4:
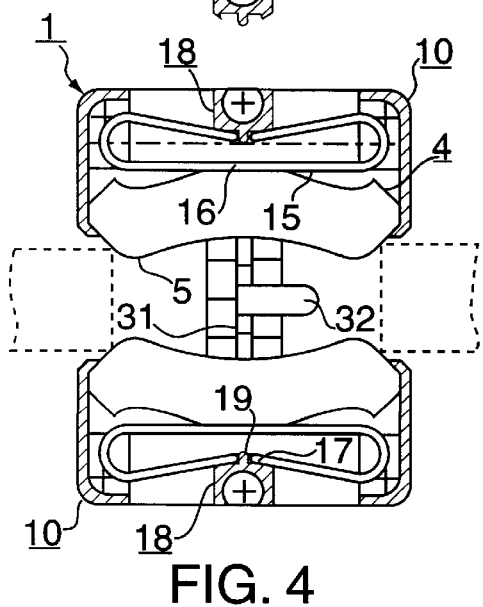
FIGS. 4 and 5 correspond to FIGS. 1 and 2, but the half-housings that form the break-contact block are mounted with a greater distance between them than that illustrated in FIGS. 1 and 2.

Foot sections 11 and 12 project like a pedestal away from the housing body and are provided with ribs 21 for reinforcement. The foot sections 11 and 12 are positioned opposite each other on the face of each half-housing 10 to connect two identical half-housings. A comparison of FIGS. 1 and 2 as well as FIGS. 4 and 5 shows that a smaller distance S1 (break-contact block 1, FIGS. 1 and 2) or a larger distance S2 (break-contact block 1', FIGS. 4 and 5) is formed, depending on the position in which the two half-housings 10 are assembled. This is based on the design of foot sections 11 and 12, which is discussed in greater detail below on the basis of FIGS. 6 to 9.

Figure 2:
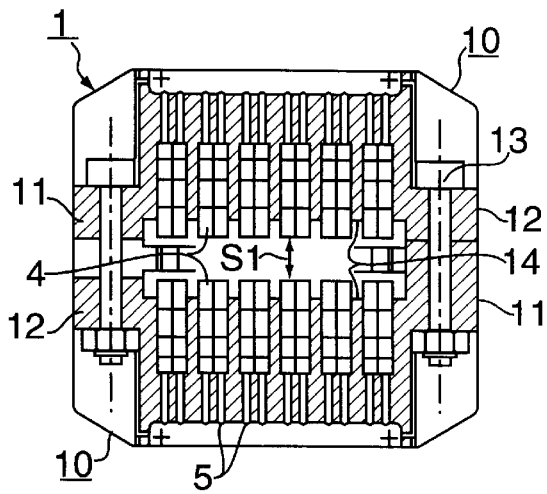
FIG. 2 is a cross-section view of the break-contact block according to FIG. 1 in a section taken across the busbars that are to be connected.
Figure 6:
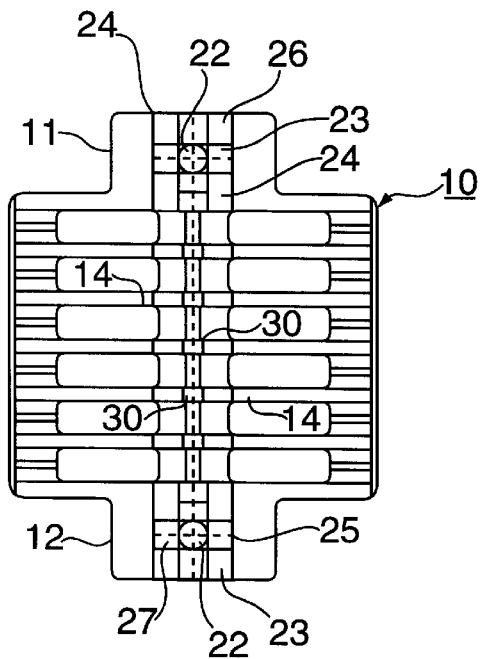
FIG. 6 is a top view of the foot parts of the housing part of a break-contact block.
Figure 8:
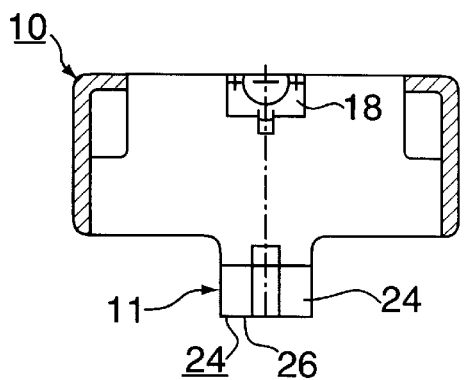
FIG. 8 is a cross-section view and FIG. 9 is a front view of the half-housings according to FIGS. 6 and 7.

As FIG. 6 shows, each of the foot sections 11 and 12 has a passage 22 to accommodate the mounting elements 13 and 13' that serve as fasteners, which are illustrated in FIGS. 2, 3 and 4. Starting from a base 23, foot section 11 has four prismatic projections 24 that are symmetrical around passage 22. The opposite foot section 12 also has four projections 25 that start from a base 23 and are also symmetrical with passage 22. However, projections 24 are offset with respect to projections 25 to the extent that there is a projection 25 precisely at the location where there is a space between projections 24 on the other foot section. The size of the projections and their spacing are selected so that a foot section 12 can be placed on foot section 11, and then projections 24 and 25 can be joined, forming an essentially closed configuration that is approximately parallelepiped-shaped. This yields the smaller spacing S1 shown in FIG. 2. However, if two half-housings 10 are assembled in such a way that foot section 11 comes in contact with a foot section 11 on another half-housing 10 and foot section 12 comes in contact with the corresponding foot section 12 on the other half-housing 10, then faces 27 on projections 24 will contact each other and faces 27 on projections 25 will contact each other. This then yields the larger spacing S2 shown in FIG. 5. In this case, longer mounting elements 13' are provided instead of mounting elements 13.

The difference between spacings S1 and S2 can be influenced by selecting the length of projections 24 and 25 accordingly. It is also possible to achieve a third spacing distance that is between spacings S1 and S2 by providing a filler piece that can be inserted into the spaces between projections 26.

In the embodiment described here, the half-housings each have a foot section on opposite sides. Consequently, the half-housings are joined together reliably and nevertheless the space between the half-housings is restricted very little. However, the half-housings can be provided with a larger number of foot sections if additional connections are desired because of certain requirements regarding the dimensions, the strength or similar features.

Figure 7:
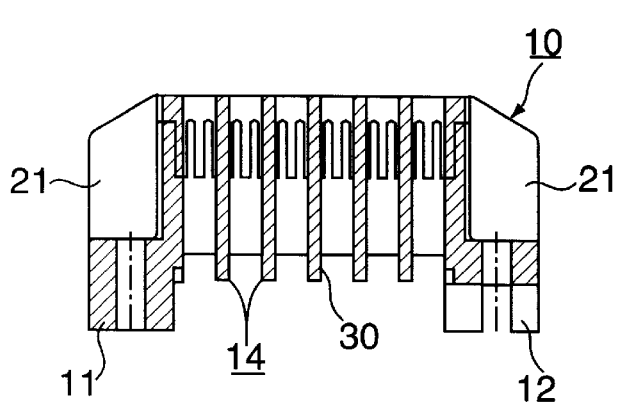
FIG. 7 is a cross-sectional side view of the foot part according to FIG. 6 of the housing part of a break-contact block.
Figure 9:
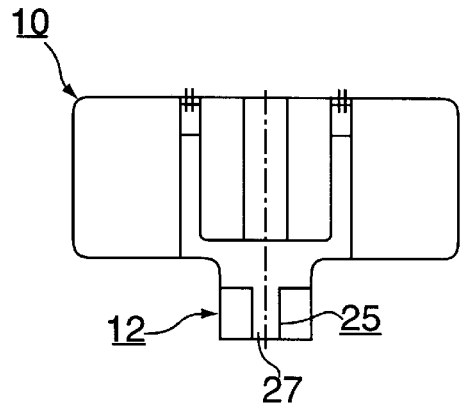

As shown especially in FIGS. 6 and 7, partitions 14 have aligned recesses 30 into which a spacer 31 is inserted. The spacer 31 is shown in FIG. 1. Contacts 4 are held at a distance by spacer 31 such that busbars 2 and 3 can be inserted. Spacer 31 is provided with a rounded projection 32 on its side facing busbar 3, which permits a pivoting movement of the break-contact block 1 relative to busbar 8 when the latter is accommodated between contacts 4.

Figure 10:
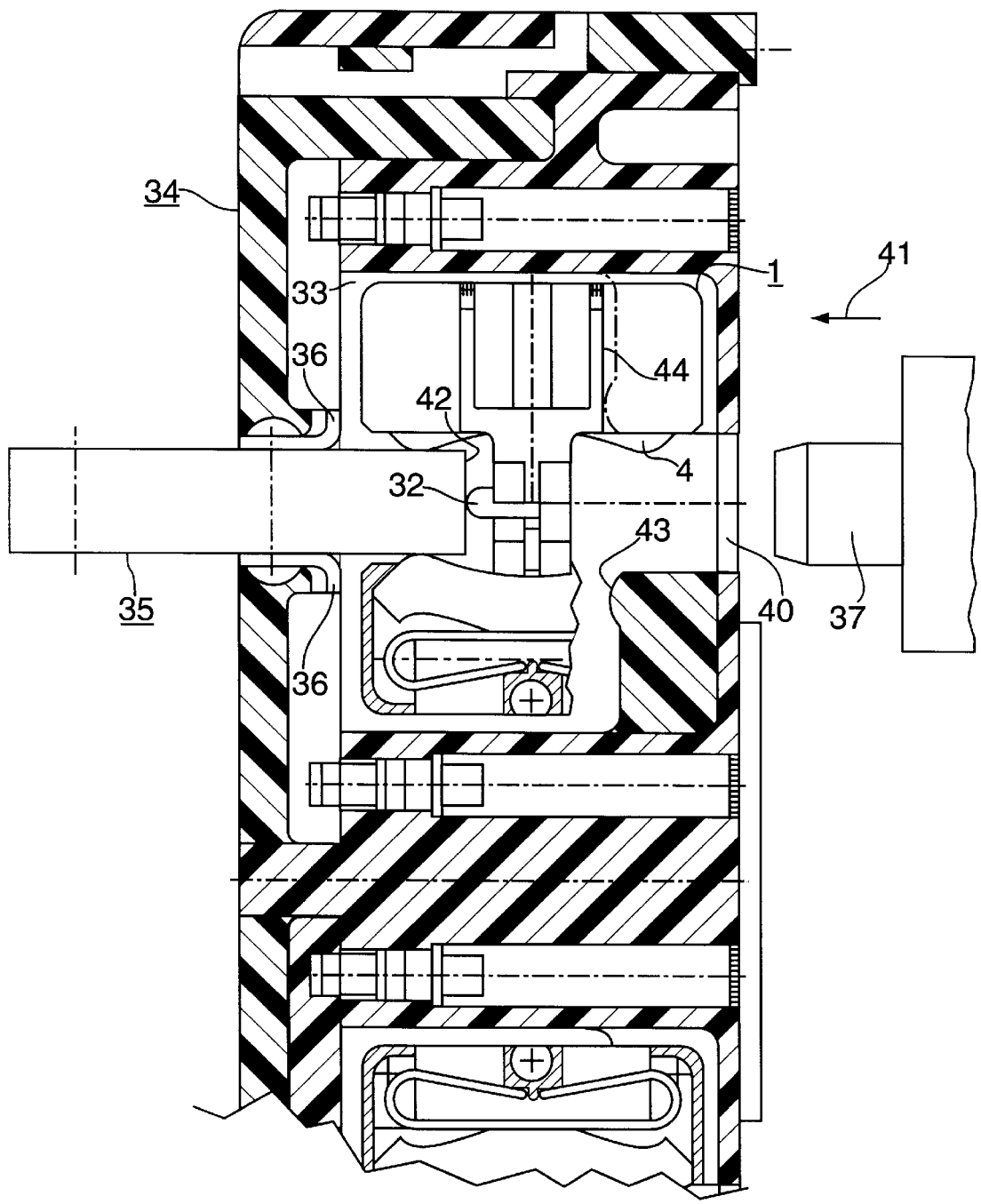
FIG. 10 is a cross-section view showing one example of the use of a break-contact block according to this invention.

The interaction of spacer 31 with other features of break-contact block 1 or 1' is explained below on the basis of FIG. 10, which illustrates one application of a switchgear with a draw-out circuit-breaker. The break-contact block mentioned above is accommodated in a recess 33 of an insulated housing 34 that is provided for a stationary mount in the switchgear. FIG. 10 shows a section through one of a total of six connection points that are needed when a triple-pole circuit-breaker is to be connected to stationary busbars. Stationary busbar 35 associated with break-contact block 1 is mounted on insulated housing 34 by means of two mounting brackets 36. Contacts 4 of break-contact block 1 are engaged with the end of busbar 35, while the opposite busbar 37 of the circuit-breaker (not shown) is illustrated as being some distance away from an insertion orifice 40 of insulated housing 34. Busbar 37 can be made to engage with contacts 4 by moving it in the direction of arrow 41.

As FIG. 10 shows, break-contact block 1 is in contact with a face 42 of busbar 35 by means of rounded projections 32. Furthermore, convex abutments 43 of insulated housing 34 are each opposite a face 44 that is formed by ribs 21 of half-housings 10 (FIGS. 3, 5). This arrangement permits an approximately parallel sliding movement of break-contact block 1 in recess 33 to equalize the tolerance with an axial offset of busbars 35 and 37. Break-contact block 1 is thus supported so it floats, so to speak, in recess 33 of insulated housing 34. This assures a good current transfer between busbars 35 and 37 with little heating of the contacts accordingly.

I claim:

1. A break-contact block for connecting or isolating busbars that can be moved relative to each other, said break-contact block comprising:

a housing; and bridge-like contacts arranged parallel to each other in the housing, said contacts being movable relative to each other and having contact faces at ends thereof for contacting the busbars to be connected, said contacts being biased by springs against the busbars, and wherein two sets of said contacts are positioned opposite each other to form parallel current paths, wherein the housing comprises two half-housings, each having foot sections for supporting the foot sections of the other, said half-housings also including passages for receiving mounting elements, and said half-housings including partitions for subdividing space accommodating the contacts.

2. The break-contact block of claim 1, wherein the foot sections each have a base and at least one projection extending from the base, wherein the projections of said foot sections are offset relative to each other such that when the two half-housings are joined in one position, the at least one projection of one foot section has a face in contact with the base of an opposite foot section, forming a relatively small distance between the two half-housings, and wherein when the two half-housings are joined together in an offset arrangement where one of the two half-housings is rotated by 180 relative to another one of the two half-housings from said one position, the projections on opposing foot sections are in contact at their faces, forming a larger distance between the two half-housings.

3. The break-contact block of claim 2, wherein each foot section includes a plurality of projections symmetrically positioned with respect to a passage for a mounting element.

4. The break-contact block of claim 3, wherein each of the foot sections has four projections with generally the same total cross section, said projections adapted to be joined together in a closed configuration to form the relatively small spacing between the half-housings from the offset arrangement.

5. The break-contact block of claim 1, wherein each half-housing has two foot sections each having a pedestal shape and including ribs.

6. The break-contact block of claim 5, wherein the ribs each include a supporting face to support an abutment of an insulated housing.

7. The break-contact block of claim 1, wherein said springs comprise bent wire springs, each associated with a contact, and said springs each include curved leg ends in contact with a web extending across the partitions on each of the half-housings.

8. The break-contact block of claim 7, wherein the web has a rib separating the leg ends of the springs for centering the springs.

9. The break-contact block of claim 1, wherein each contact has a rear face with an outward curvature for supporting said contact on one of the springs approximately at a center of said contact.

10. The break-contact block of claim 1, wherein the partitions have aligned recesses to accommodate a spacer having a rounded projection for contacting a face of a busbar and keeping the contacts a suitable distance apart for insertion of the busbars.

11. The break-contact block of claim 6, wherein the break-contact block is adapted to be accommodated by an insulated housing having one or more abutments, and a busbar is attached by means of holding elements that seal off the insulated housing.

* * * * *